(12) United States Patent
Gilday et al.

(10) Patent No.: US 11,391,754 B1
(45) Date of Patent: Jul. 19, 2022

(54) AIRCRAFT STATIC PORT LEECH

(71) Applicant: NAV-AIDS LTD, Montréal (CA)

(72) Inventors: Brent Duncan Gilday, Montreal (CA); Van Jean Sinnott, Brossard (CA)

( * ) Notice: Subject to any disclaimer, the term of this patent is extended or adjusted under 35 U.S.C. 154(b) by 0 days.

(21) Appl. No.: 17/411,620

(22) Filed: Aug. 25, 2021

Related U.S. Application Data

(60) Provisional application No. 63/070,650, filed on Aug. 26, 2020.

(51) Int. Cl.
*G01P 21/02* (2006.01)
*G01P 5/165* (2006.01)
*G01P 5/17* (2006.01)

(52) U.S. Cl.
CPC ............ *G01P 21/025* (2013.01); *G01P 5/165* (2013.01); *G01P 5/17* (2013.01)

(58) Field of Classification Search
CPC ................................. G01P 5/17; G01P 21/025
USPC ........................................................... 73/1.29
See application file for complete search history.

(56) References Cited

U.S. PATENT DOCUMENTS

| | | | |
|---|---|---|---|
| 2,371,243 A | 3/1945 | Jordan | |
| 2,897,669 A * | 8/1959 | Luck | G01N 23/18 248/362 |
| 3,186,212 A * | 6/1965 | Sharko | G01L 27/007 73/1.58 |
| 3,518,870 A * | 7/1970 | Scharringhausen | G01P 21/025 73/1.29 |
| 4,182,158 A * | 1/1980 | Culotta | G01M 9/06 73/40 |
| 4,384,469 A | 5/1983 | Murphy | |
| 4,617,826 A | 10/1986 | Hagen | |
| 5,372,761 A * | 12/1994 | Anderson, Sr. | B32B 17/10963 425/13 |
| 7,581,426 B2 | 9/2009 | Gilday | |
| 7,712,807 B2 * | 5/2010 | Perlman | B65G 47/91 294/185 |
| 9,995,608 B1 | 6/2018 | Shintaku | |
| 10,184,953 B2 | 1/2019 | Wohlford | |
| 10,301,042 B2 | 5/2019 | Piggin et al. | |
| 2007/0243012 A1 | 10/2007 | Gilday | |
| 2012/0210553 A1* | 8/2012 | Chen | B66C 1/0243 294/183 |

(Continued)

FOREIGN PATENT DOCUMENTS

| | | |
|---|---|---|
| CA | 639488 A | 4/1962 |
| CA | 664982 A | 6/1963 |
| CA | 2535577 A | 8/2007 |

OTHER PUBLICATIONS

International application No. PCT/CA2017/050325 International Preliminary Report on Patentability Chapter I dated Sep. 10, 2019.

(Continued)

*Primary Examiner* — Nathaniel J Kolb
(74) *Attorney, Agent, or Firm* — Anglehart et al.

(57) ABSTRACT

This application relates to an aircraft static port testing device in which a static leech may fixed to the static port of an aircraft. The static leech may be held in place by a suction cup surrounding the static port and the static port may be connected to an aircraft air data testing unit through a static port fitting. Vacuum may be created in the suction cup through a vacuum syringe or a vacuum pump.

6 Claims, 4 Drawing Sheets

(56) References Cited

U.S. PATENT DOCUMENTS

2019/0256225 A1    8/2019  Gilday et al.

OTHER PUBLICATIONS

International application No. PCT/CA2017/050325 International Search Report dated Oct. 16, 2017.
International application No. PCT/CA2017/050325 Search Strategy dated Oct. 16, 2017.
International application No. PCT/CA2017/050325 Written Opinion of the International Searching Authority dated Oct. 16, 2017.

* cited by examiner

AIRCRAFT STATIC PORT LEECH

CROSS-REFERENCE TO RELATED APPLICATIONS

This patent application claims priority to U.S. provisional patent applications 63/070,650 filed Aug. 26, 2020, the contents of which are hereby incorporated by reference.

TECHNICAL FIELD

The present patent application relates to the field of aircraft air data system testing equipment, and in particular to the testing equipment for the pitot static port.

BACKGROUND

The air data system (ADS) is one of the essential avionic systems found in modern aircraft. Based on air pressure and outside air temperature readings, the air data system calculates and provides airspeeds (calibrated, true and Mach) and pressure altitudes to both the pilots and other avionics and propulsion systems. As such, the ADS is one of the aircraft's systems which may require frequent maintenance and calibration in order to maintain the certified performance. For example, in order to keep a valid reduced vertical separation minima (RVSM) certification, the pressure altitude errors must be kept inside a very strict error budget.

In order to provide its outputs, the air data system uses pressure data from two types of probes, a pitot tube and a pitot static. While the pitot tube provides the ram-air pressure measurements (i.e. total pressure), the pitot static measures the free-stream airflow static pressure (i.e. ambient pressure). Both these probes are essential to the air data system and thus require to be maintained, tested and calibrated throughout the life of an aircraft (either at given flight hours intervals or when certain modifications/repairs are done to systems or to the outer envelope of the aircraft structure).

As such, testing equipment for the pitot tubes and pitot static ports are required. It is well known in the art to connect the pitot tubes and pitot static ports to an air data testing unit, which can simulate different pressure conditions representative of an aircraft flight profile, such that the aircraft readouts may be compared to the conditions being tested.

In order to properly assess the aircraft system's compliance, airtight adapters must be provided to connect the air data testing units to the pitot tubes and pitot static ports. Without a proper seal isolating the probes from the ambient air, the testing and calibration may not be representative (i.e. a small leak may result in a significant pressure altitude or airspeed change).

While a number of pitot static port (aircraft skin ports) adapters exist in the prior art, they typically tend to be cumbersome and necessitate extra powered equipment (e.g. vacuum pump) to function properly.

SUMMARY

The applicant has discovered that the pitot static port adapters, for aircraft skin ports, may be significantly improved by removing the need for vacuum pumps and by reducing the equipment size to the smallest possible form factor. Using new performance material for a suction cup, the downward force created when partially vacuumed is sufficient to ensure proper sealing of the aircraft static port.

Therefore, it is possible to perform pitot static testing with an adapter having a single suction cup, greatly easing the testing installation requirements. Depending on the size of the aircraft static port, the suction cup may simply be manually depressed to create sufficient partial vacuum inside the suction cup. The suction cup may also be connected to a vacuum device to create a sufficient vacuum inside the suction cup. By using the new suction cup materials, a vacuum syringe may provide a sufficient vacuum for the use contemplated herein.

A first broad aspect is a static port testing device including: a static port adapter including a suction cup and a static port fitting to seal a static port and couple the static port to an airtight conduit, where the static port fitting is enclosed inside the suction cup; and a pneumatic connector to connect the airtight conduit to an air data tester.

In some embodiments, the static port adapter further includes a vacuum conduit connecting the suction cup to a vacuum device to create partial vacuum inside the suction cup.

In some embodiments, the vacuum device is a vacuum syringe.

In some embodiments, the vacuum device is a vacuum pump.

A second broad aspect is a method of performing an aircraft pitot-static leak test or an air data system calibration comprising: fixing a static port testing device to an aircraft static port; connecting the pneumatic connector to an air data tester; and performing the aircraft pitot-static leak test or the air data system calibration.

In some embodiments, where the static port testing device includes a vacuum conduit connecting the suction cup to a vacuum device, the fixing the static port testing device further includes: positioning the static port testing device over the aircraft static port; depleting air inside the suction cup with the vacuum device; and ensuring the static port testing device is securely attached to the aircraft static port.

BRIEF DESCRIPTION OF THE DRAWINGS

The invention will be better understood by way of the following detailed description of embodiments of the invention with reference to the appended drawings, in which.

DETAILED DESCRIPTION

Figure 1:
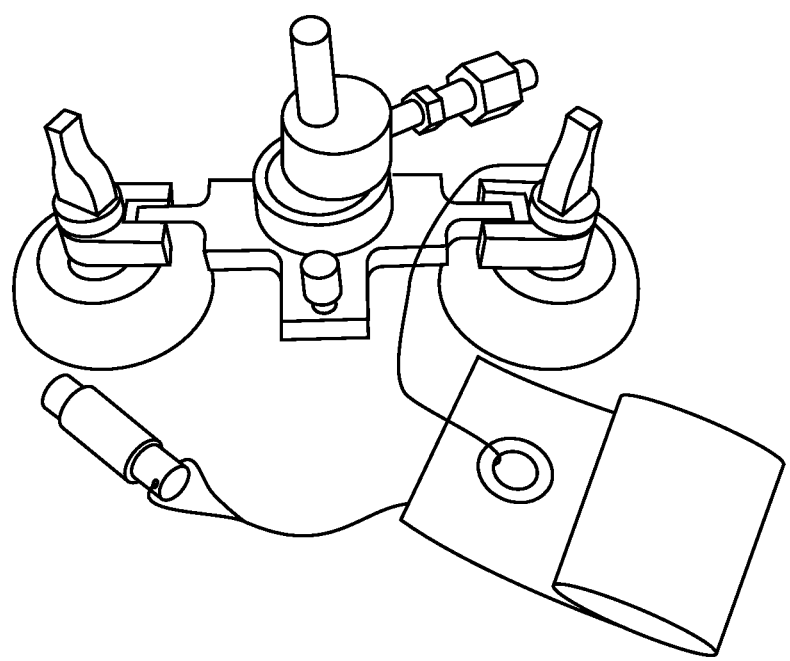
FIG. 1 is a pitot static port adapter with a dual suction cup attachment mechanism as found in the prior art.

The present disclosure relates to an aircraft static port leech for connecting an aircraft skin static port to an aircraft air data testing unit. Such aircraft static port leech allows for the testing or calibration of the aircraft air data system.

In the present disclosure, it will be understood that the term suction cup is used to mean a device that uses the negative fluid pressure of air to adhere to a nonporous surface (partial vacuum conditions are created inside the suction cup). The term suction cup, as used herein, covers any ways of creating this partial vacuum, such as using mechanical means (applying pressure on the cup to partially remove air from inside the cup) or using a vacuum device (e.g. vacuum pump) to deplete air inside the cup (which may otherwise be known as a vacuum cup in the art). As such, the term suction cup used herein encompasses any fixation system similar to a conventional suction cup or a vacuum cup.

Air data system testing equipment, such as the adapters to connect to the aircraft pitot tubes and pitot static ports are well known in the art. Different aircraft probes requires different adapters in order to perform the tests. For example, some aircraft design uses pitot tubes with static ports directly on the pitot tube, while others have separate pitot tubes and pitot static ports. As pitot static ports are meant to measure the free-stream airflow pressure, separated pitot static ports would typically reside directly on the aircraft skin and in a relatively aerodynamically undisturbed zone of the aircraft.

This type of pitot static ports therefore requires an adapter that covers the static port (circular region with holes) while having a means of fixing to the adapter in place. In order to provide reliable test data, the adapter must necessarily form an airtight enclosure around the static port, such that no air leaks with ambient air may be present. By having an airtight enclosure, the only air source affecting the aircraft air data system during the test stems from the air data testing unit connected to the adapter. These air data testing units are well known in the art and provide, at a minimum, a means to supply the tested probe with a known pressure representative of the desired test condition.

While the present disclosure is limited to an aircraft pitot static port adapter, it will be understood that any testing described herein requires the use of air data testing units and other equipment (e.g. power source, recorders, etc.) may be any suitable equipment known in the art.

One of the issues that a pitot static port adapter must overcome is the means to fix the device in place. As the aircraft skin and structure surrounding the pitot static port has a curvature and is exempt of any attachment points, a solution often used in the prior art is to have a number of suction cups. As such, the plurality of suction cups tends to produce the force required to securely seal the airtight connection between the aircraft pitot static port and the tube connected to the air data testing unit.

FIG. 1 is an exemplary pitot static port adapter with a dual suction cup attachment mechanism as found in the prior art. This device uses two mechanical suction cups with a locking mechanism.

Other prior art embodiments feature triple suction cup attachment points in a triangular shape. It is also well known in the art to use a vacuum pump to provide the attachment suction cups with a vacuum source, such that there is an optimal suction cup strength to hold the aircraft static port adapter in place. In fact, some higher-end models of air data testing units have a built-in vacuum pump to provide this functionality at the same time as the main testing functions.

However, having a static port adapter device with multiple suction cups may result in some issues. The multiple attachment points require to be structurally linked together, resulting in cumbersome devices that have a non-negligible weight. This may result in substantial difficulties when installing the device for the test, as the central part connecting to the aircraft static port must be precisely positioned while the supporting suction cups must also be located conveniently on the aircraft skin (to prevent damage to the structure, probes, etc.). This effectively means that the installation of the device on the aircraft's skin is harder.

In order to address the issues presented by the installation of static port adapters as found in the prior art, an adapter with a single suction cup structure is disclosed herein.

Figure 2:
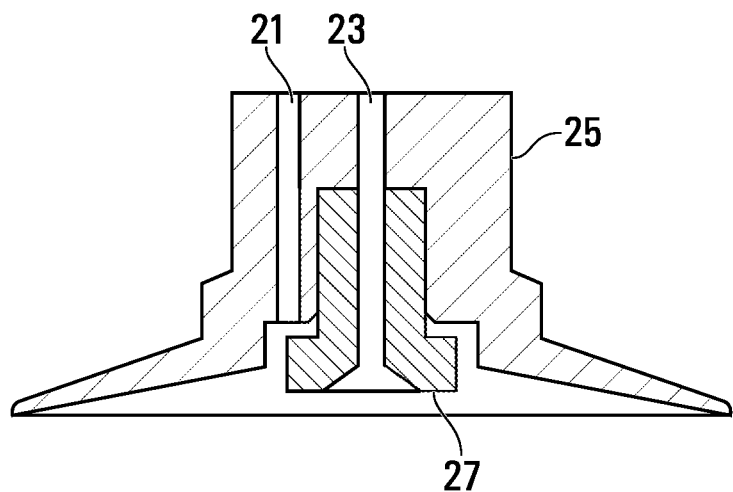
FIG. 2 is a schematic of an exemplary pitot static port leech with a single vacuum-sealed suction cup attachment mechanism.

Now referring to FIG. 2, which is a schematic of an exemplary pitot static port leech with a single vacuum-sealed suction cup attachment mechanism. In this embodiment, the complete structure of the static port adapter is comprised of a single suction cup attachment mechanism 25. The static port adapter includes a fitting 27 that, once the adapter is securely installed above the aircraft static port, seals the static port from the surrounding suction cup 25. Therefore, once the suction cup 25 is partially vacuum-sealed against the aircraft skin, there is enough force exercised on the static port fitting 27 to result in an airtight seal. As such, the only air communication between the aircraft static port and the testing equipment will be done through an airtight channel 23 which connects with the static port fitting to an airtight conduit which may ultimately be connected to the testing device.

In the embodiment of FIG. 2, the suction cup is a partial vacuum suction cup requiring the vacuum to be made by a device (syringe, pump, etc.). The suction cup 25 is thus configured with a vacuum channel 21, which allows air exchange between the suction cup 25 and a vacuum device. Once connected to the suction cup 25 through the vacuum channel 21, the vacuum device may create a partial vacuum inside the suction cup, thereafter attaching the static port adapter to the surface on which it resides. As will be further described herein, the vacuum channel 21 may be connected to the vacuum device through a suction conduit (as will be substantiated in FIG. 4).

In some embodiments, the suction cup 25 may not require a vacuum device to create sufficient force to securely attach the static port adapter to the aircraft skin while ensuring the seal of the static port fitting 27. It will be understood by someone skilled in the art that such embodiment may be done through the use of certain suction cups material providing enough vacuum force with simple mechanical pressure applied on the suction cup (i.e. pushing the suction cup against the aircraft skin). As such, it will be understood that the suction cup 25 may not always have a vacuum channel 21.

Figure 3:
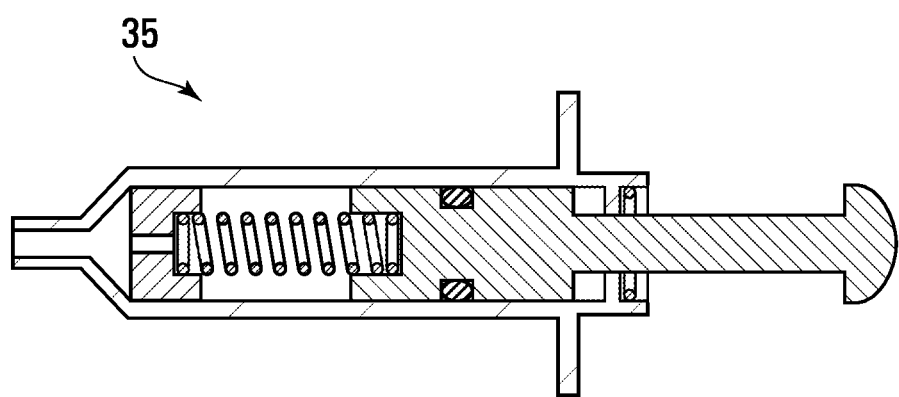
FIG. 3 is a schematic of an exemplary vacuum syringe.

FIG. 3 is a schematic of an exemplary vacuum syringe as may be used for the embodiment of FIG. 2. A vacuum syringe is a well-known in the art device that uses a syringe (i.e. a piston inside a sealed enclosure where a movement of the piston creates a fluid exchange between its enclosure and the enclosure to which it is connected to) to remove a quantity of air inside an enclosure. The vacuum syringe may therefore be used to create the partial vacuum required for the suction cup of the static port adapter to securely attach to the aircraft skin. In some embodiments, the vacuum syringe may be a 10 ml syringe with and internal spring assembly. In other embodiments, the vacuum syringe may have a higher internal volume, such that it may result in the necessary vacuum conditions while using different sizes of suction cups.

It will be understood that any other device (e.g. vacuum pump) that creates the necessary partial vacuum inside the suction cup of the static port adapter may be used, but that a vacuum syringe may be the simplest, cost-effective, low-maintenance device producing the required vacuum for the attachment of the static port adapter.

Figure 4:
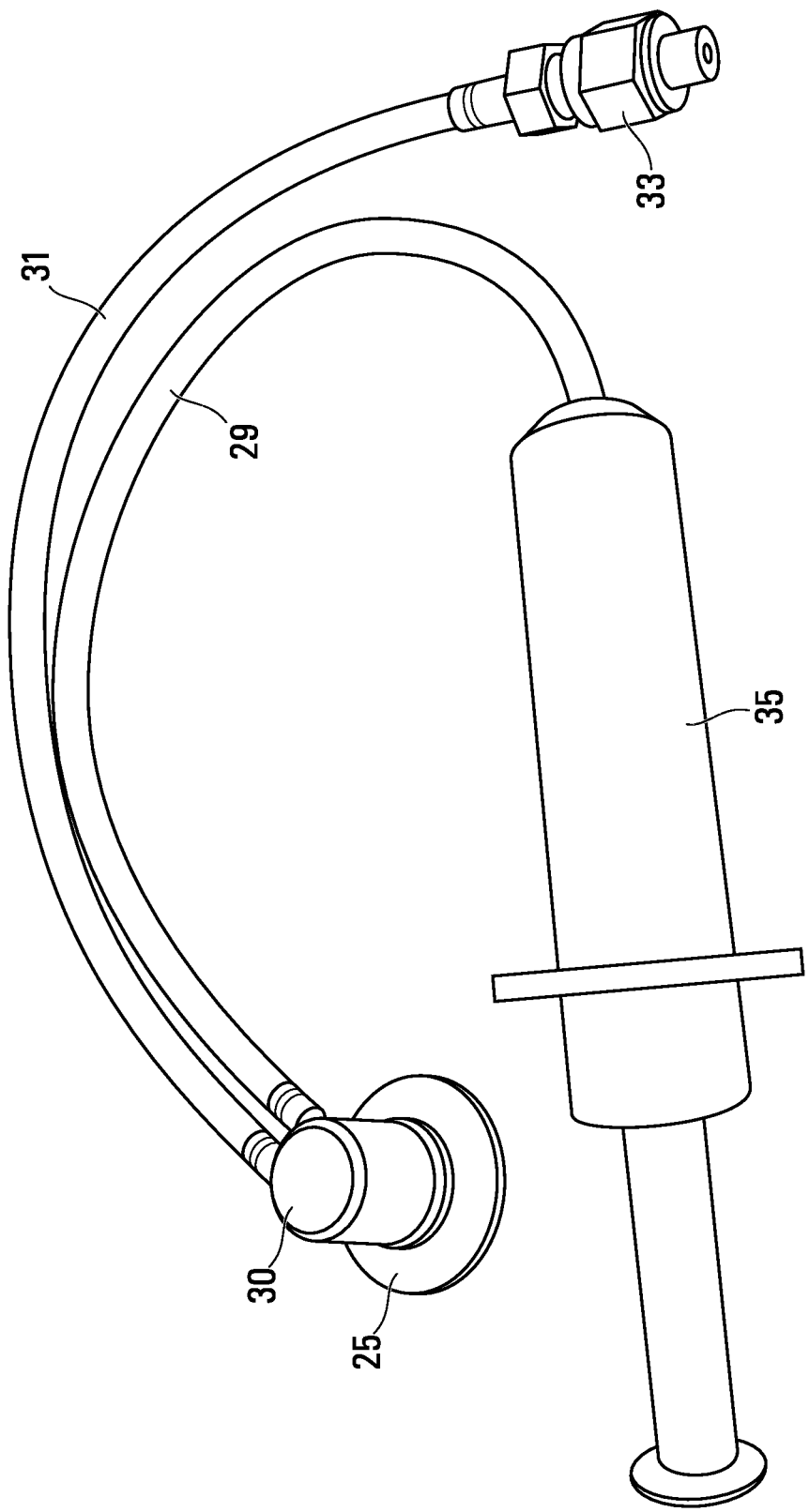
FIG. 4 is a picture of an exemplary pitot static port leech system including a vacuum syringe and an air data testing system pneumatic connector.

Now referring to FIG. 4, which is a picture of an exemplary pitot static port leech system including a vacuum syringe and an air data testing system pneumatic connector. In this embodiment, a complete exemplary pitot static port leech system is represented. The static port adapter includes the suction cup 25, to allow attachment on the aircraft skin, and two connections to tubes, the first of which is the vacuum conduit 29 which connects the vacuum device (such as a vacuum syringe) 35 to the vacuum channel 21 of the adapter. The second conduit is the airtight conduit 31, which connects the airtight channel 23 of the adapter to a pneumatic connector 33, such that the aircraft static port may be in direct pneumatic connection with the testing equipment. The pneumatic connector 33 may allow an airtight connection with an air data testing equipment in order to provide the aircraft static port with the different test conditions.

The vacuum conduit 29 and the airtight conduit 31 may be connected to the static port adapter through a coupler 30. The connections to the coupler 30 may be airtight, such that there may be no air leaks which may impact the test equipment readings and/or the vacuum conditions inside the suction cup 25. The coupler 30 may be made of aluminum or any other material which may provide sufficient rigidity to the static port adapter. The coupler 30 may thus be a cap in which the suction cup 25 is fitted (e.g. the coupler 30 may encompass the top part of the structure as illustrated in FIG. 2). The coupler 30 may connect the vacuum conduit 29 with the vacuum channel 21 and the airtight conduit 31 with the airtight channel 23.

Figure 5:
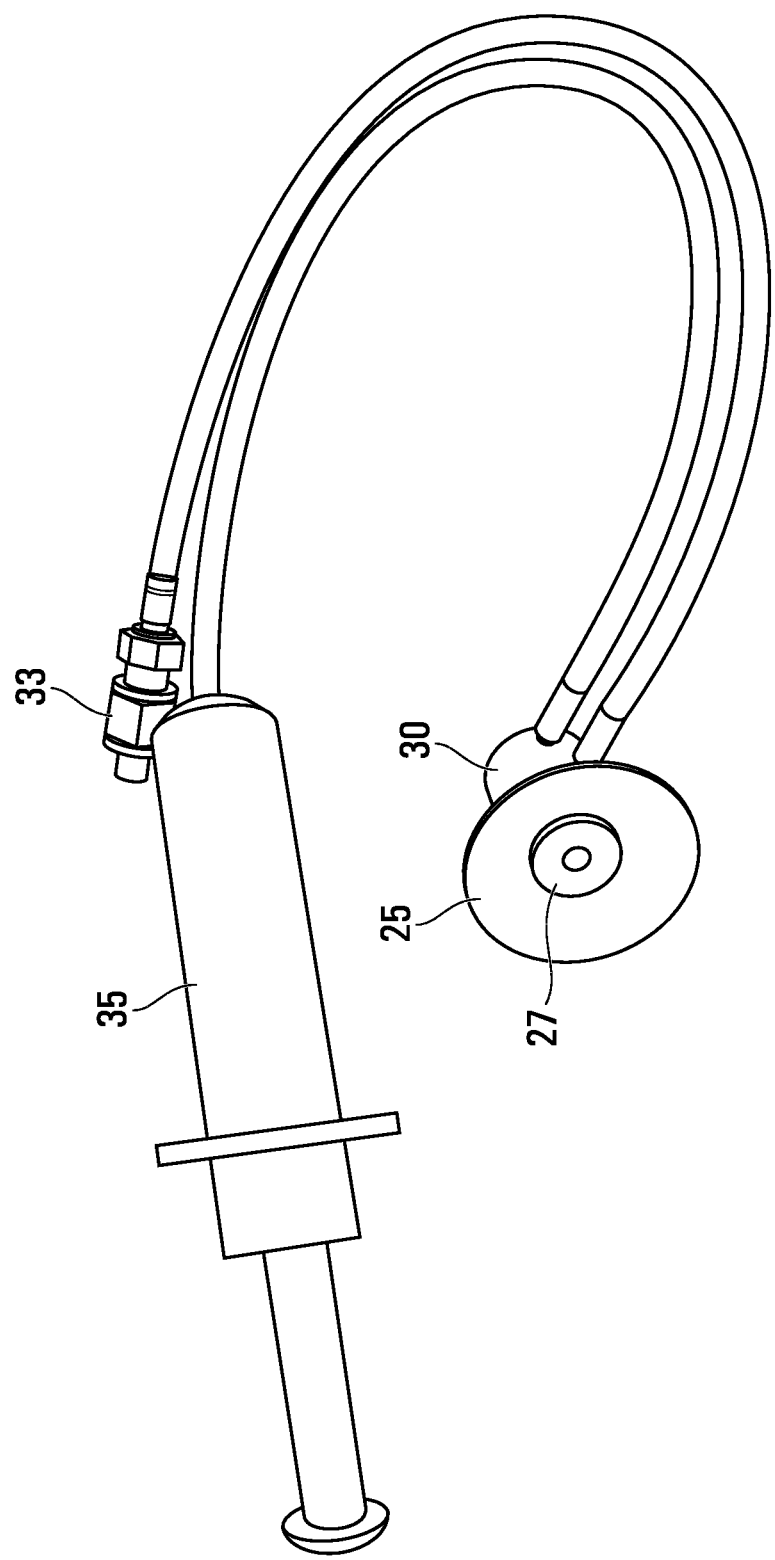
FIG. 5 is a picture of an exemplary pitot static port leech system with a bottom view of the suction cup attachment mechanism.

FIG. 5 is a picture of an exemplary pitot static port leech system with a bottom view of the suction cup attachment mechanism. As described herein, the suction cup 25 of the static port adapter provides the structural attachment to the aircraft's skin. The static port fitting 27 may effectively surround and seal the aircraft static port in order to have the air data testing equipment as the sole source of air and pressure conditions to the static port.

In some embodiments, the suction cup 25 and the static port fitting 27 may be manufactured with a degree of transparency, such as to allow easier placement of the device over the aircraft static port. Furthermore, in some embodiments, the suction cup 25 and the static port fitting 27 may be made of polyurethane, rubber (such as Nitrile rubber), silicone, PVC plastic, neoprene, etc. The preferred embodiment includes rubber compound that may be 25 Duro Nitril.

The invention claimed is:

1. A static port testing device comprising:
a static port adapter comprising a suction cup having a single conical wall and a static port fitting to seal a static port and couple said static port to an airtight conduit, wherein said static port fitting is enclosed inside said suction cup at a center of said suction cup, wherein negative pressure inside said suction cup can force said static port filling against said static port while sealing said airtight conduit from a surrounding portion of said suction cup and supporting said static port testing device on an aircraft, and wherein said static port adapter further comprises a vacuum conduit connecting said suction cup to a vacuum device to create partial vacuum inside said suction cup; and
a pneumatic connector to connect said airtight conduit to an air data tester.

2. The static port testing device of claim 1, wherein said vacuum device is a vacuum syringe.

3. The static port testing device of claim 1, wherein said vacuum device is a vacuum pump.

4. A method of performing an aircraft pitot-static leak test or an air data system calibration comprising:
fixing a static port testing device to an aircraft static port, said static port testing device being as defined in claim 1;
connecting said pneumatic connector to an air data tester; and
using said air data tester to conduct at least one pitot-static leak test or air data system calibration.

5. The method as defined in claim 4, wherein said static port testing device comprises a vacuum conduit connecting said suction cup to a vacuum device, said fixing said static port testing device further comprises:
positioning said static port testing device over said aircraft static port;
depleting air inside said suction cup with said vacuum device; and
securely attaching said static port testing device to said aircraft static port.

6. The static port testing device of claim 1, wherein said suction cup is transparent.

* * * * *